(12) United States Patent
Hartwich

(10) Patent No.: US 9,319,237 B2
(45) Date of Patent: Apr. 19, 2016

(54) METHOD AND DEVICE FOR CONTROLLING A BUS SYSTEM AND A CORRESPONDING BUS SYSTEM

(75) Inventor: Florian Hartwich, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1135 days.

(21) Appl. No.: 11/630,485

(22) PCT Filed: Jun. 6, 2005

(86) PCT No.: PCT/EP2005/052577
§ 371 (c)(1),
(2), (4) Date: May 20, 2009

(87) PCT Pub. No.: WO2006/000517
PCT Pub. Date: Jan. 5, 2006

(65) Prior Publication Data
US 2009/0240857 A1     Sep. 24, 2009

(30) Foreign Application Priority Data

Jun. 26, 2004   (DE) .................. 10 2004 030 969

(51) Int. Cl.
| | |
|---|---|
| G06F 3/00 | (2006.01) |
| G06F 5/00 | (2006.01) |
| G06F 13/42 | (2006.01) |
| G06F 1/00 | (2006.01) |
| G06F 1/04 | (2006.01) |
| G06F 1/14 | (2006.01) |
| G06F 1/24 | (2006.01) |

(Continued)

(52) U.S. Cl.
CPC .......... *H04L 12/407* (2013.01); *G06F 13/4286* (2013.01); *H04J 3/0658* (2013.01); *H04L 7/04* (2013.01); *H04L 2012/4026* (2013.01); *H04L 2012/40215* (2013.01); *H04L 2012/40241* (2013.01); *H04L 2012/40273* (2013.01)

(58) Field of Classification Search
USPC ............................ 710/58, 105; 713/501–503
See application file for complete search history.

(56) References Cited

U.S. PATENT DOCUMENTS 5,999,580 A * 12/1999 Sakoda et al. ................ 375/354
6,476,370 B1 * 11/2002 Suzuki et al. ............ 250/208.1

(Continued)

FOREIGN PATENT DOCUMENTS

| | | |
|---|---|---|
| EP | 1 115 220 | 7/2001 |
| JP | 2001-308868 | 11/2001 |

(Continued)

OTHER PUBLICATIONS

Hartwich et al., *Timing in the TTCAN Network*, Proc. of the International Can Conf., Feb. 28, 2002 pp. 1-8.

(Continued)

*Primary Examiner* — Faisal M Zaman
(74) *Attorney, Agent, or Firm* — Kenyon & Kenyon LLP

(57) ABSTRACT

Method for controlling a bus system having at least two users, a first user repeatedly transmitting a reference message in at least one predeterminable time interval over the bus system, the reference message being triggered by time trigger information when the time information reaches a time mark assigned to the trigger information, wherein the time mark is altered at least once in such a way that when the time information reaches the altered time mark, time shifting of the trigger information occurs.

4 Claims, 2 Drawing Sheets

(51) Int. Cl.
  *G06F 11/00* (2006.01)
  *H04L 12/407* (2006.01)
  *H04J 3/06* (2006.01)
  *H04L 7/04* (2006.01)
  *H04L 12/40* (2006.01)

(56) References Cited

U.S. PATENT DOCUMENTS

| | | | | |
|---|---|---|---|---|
| 6,671,817 B1* | 12/2003 | Snyder | | 713/401 |
| 6,760,798 B1* | 7/2004 | Aldworth | | G06F 1/14 327/119 |
| 6,804,793 B2* | 10/2004 | Josephson et al. | | 713/501 |
| 6,842,162 B2* | 1/2005 | Gariboldi et al. | | 345/87 |
| 7,055,050 B2* | 5/2006 | Domon | | 713/400 |
| 7,058,729 B1* | 6/2006 | Le Scolan | | H04J 3/0655 370/321 |
| 7,210,054 B2* | 4/2007 | Jahagirdar et al. | | 713/502 |
| 7,325,153 B2* | 1/2008 | Terry | | 713/501 |
| 2003/0042506 A1* | 3/2003 | Kellgren | | G06F 1/08 257/200 |
| 2003/0131171 A1* | 7/2003 | Weigl | | H04J 3/0652 710/305 |
| 2004/0156462 A1* | 8/2004 | Fuehrer et al. | | 375/354 |
| 2004/0158362 A1* | 8/2004 | Fuehrer et al. | | 701/1 |
| 2006/0174042 A1* | 8/2006 | Weigl et al. | | 710/100 |

FOREIGN PATENT DOCUMENTS

| | | |
|---|---|---|
| WO | 02 075561 | 9/2002 |
| WO | 02 076031 | 9/2002 |

OTHER PUBLICATIONS

Fuehrer et al., *Time Triggered Communication on CAN*, Proc. of the International CAN Conf., 2000, pp. 1-7.

\* cited by examiner

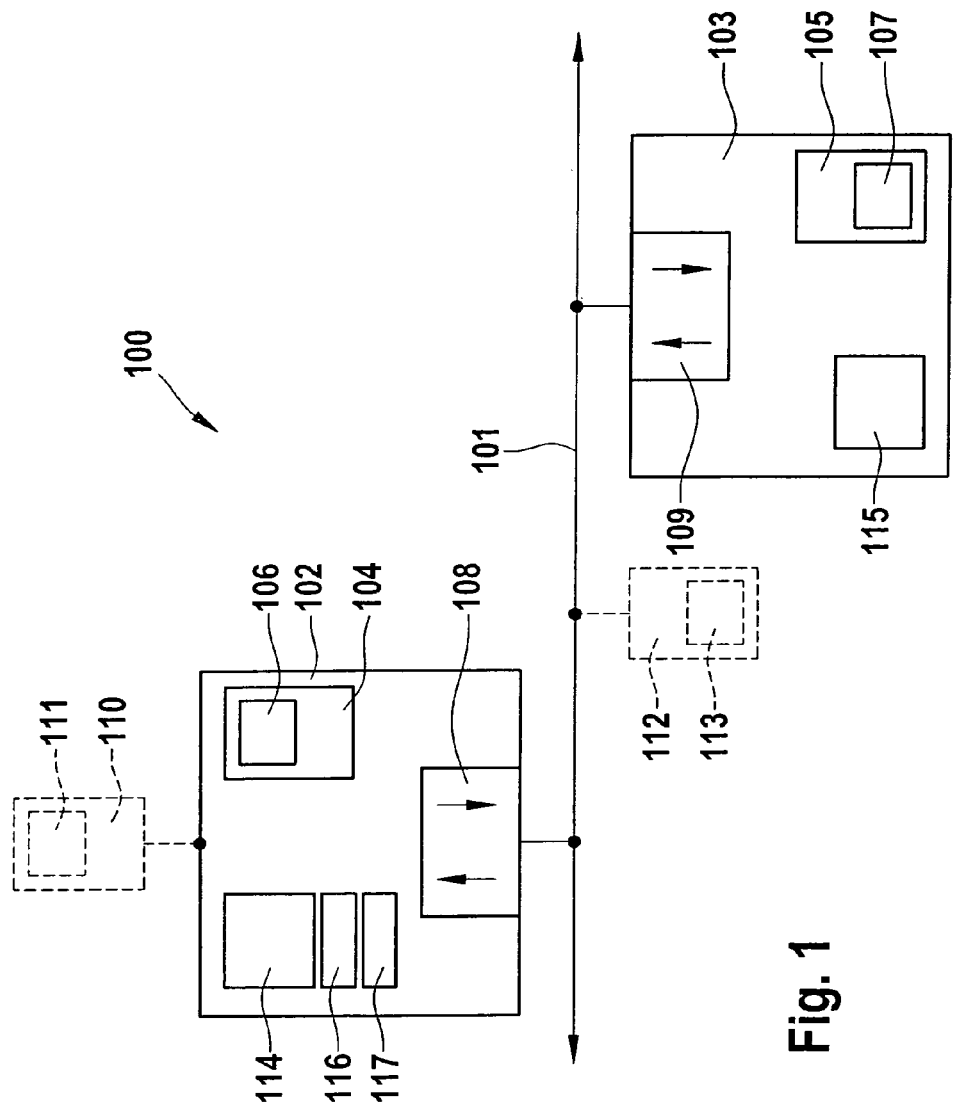

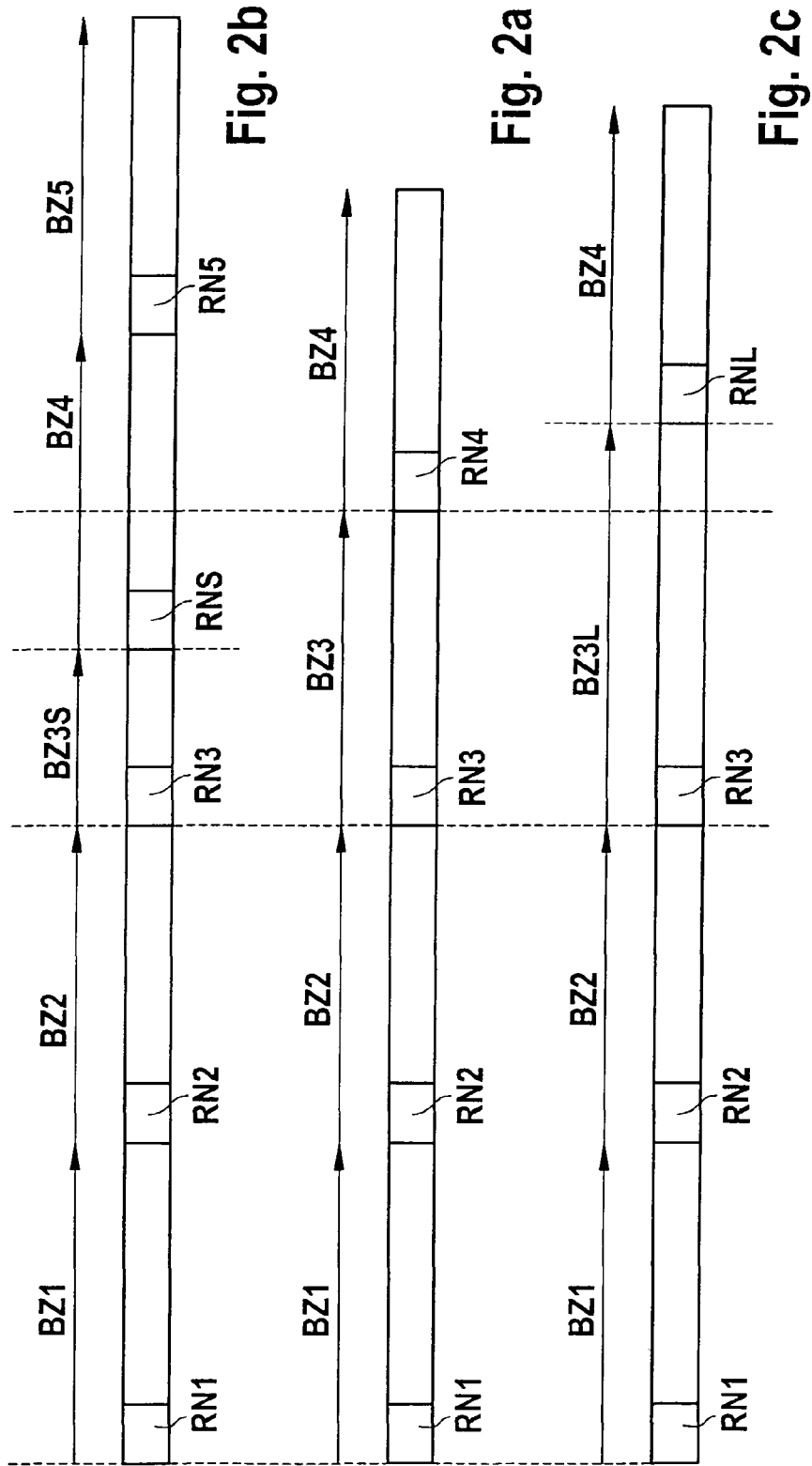

METHOD AND DEVICE FOR CONTROLLING A BUS SYSTEM AND A CORRESPONDING BUS SYSTEM

FIELD OF THE INVENTION

The present invention is directed to a method and a device for controlling a bus system and a corresponding bus system having at least two users, a first user repeatedly transmitting a reference message over the bus system in at least one predeterminable time interval

BACKGROUND INFORMATION

Such a reference message for generating basic cycles as part of a time-triggered communication on a bus system is used in FlexRay or in TTCAN, for example. Such bus systems are necessary because the interconnection of control units, sensors, and actuators has recently increased drastically in the production of modern vehicles and in mechanical engineering, in particular in the machine tool area, as well as in automation. Synergistic effects due to distributing functions among multiple control units may be achieved in this way. Communication among various stations in such distributed systems takes place increasingly via a bus system. Communications traffic on the bus system, access and reception mechanisms, and fault handling are regulated via a protocol.

The protocol, which is established in the automotive field, for example, is a CAN (Controller Area Network) which is an event-controlled protocol, i.e., protocol activities such as the sending of a message are initiated by events having their origin outside of the communication system, i.e., the bus system. This is thus an event-controlled bus system which may be triggered in particular by external events. In this way the CAN protocol is very flexible and adding additional users and messages is thus possible with no problem.

An alternative approach for event-controlled spontaneous communication is the purely time-triggered approach. All communication activities on the bus are strictly periodic. Protocol activities such as sending a message are triggered only by the progression of a time which is valid for the entire bus system. Access to the medium is based on the allocation of time ranges in which a transmitter has an exclusive transmission right. The protocol is comparatively inflexible, and new nodes are only able to be added when the corresponding time ranges have been left free. This circumstance requires the message sequences to be set before the starting operation. Thus a timetable is created that must comply with the message requirements regarding repeat rate, redundancy, deadlines, etc. Positioning of the messages within the transmission periods must be coordinated with the applications which produce the message content to minimize latencies between application and sending instant. Without this coordination, the advantage of time-control transmission, i.e., minimal latency and jitter when sending the message on the bus, would be lost. High demands are thus placed on the planning tools in a purely time-triggered approach.

The method of achieving this object of a time-triggered controller area network known as TTCAN (Time-Triggered Controller Area Network) as defined in the ISO 11898-4 Standard Draft from 2003 (ISO/TC 22/SC3) meets the requirements outlined above for time-triggered communication and the requirements for a certain degree of flexibility. TTCAN fulfills these requirements by constructing communication cycles, known as basic cycles, by sending a reference message through the timer, known as the time master. These basic cycles are then divided into exclusive time windows for periodic messages of certain communication users and into arbitrating time windows for spontaneous messages of multiple communication users.

The following assumes a TTCAN network as the bus system, this not being with regard to the subsequent object of the present invention. Instead the object of the present invention to be explained later may also be used with other comparable bus systems such as FlexRay.

In such systems, the communication cycle is determined by a basic cycle, as already mentioned, i.e., by a timer or a first user that repeatedly transmits a reference message in at least one predeterminable time interval over the bus system, the reference message being triggered by time-trigger information when the time information reaches a time mark assigned to the trigger information. The time information in TTCAN is the cycle time, for example, which is predetermined by the local time, i.e., the local clock of the timer or the time master and by the reference message. If this time information, i.e., the cycle time of the TTCAN, reaches a certain time mark, a trigger is always triggered when this time mark is reached to start the particular reference message. The time master in the bus system therefore specifies the time for the bus system according to the basic cycle. If there should now be a shift in such a basic cycle, the TTCAN protocol, for example, offers the option of shifting the communication by setting a bit in such a reference message. Such a shift is necessary in particular to synchronize the TTCAN bus to the phase, in particular an external time base, e.g., when the event synchronized time-triggered communication option is used in the TTCAN. However, two actions are necessary for this in TTCAN according to ISO 11898-4. First, the time master or host must set a bit, known as the Next_is_Gap bit, in the reference message and then wait until the corresponding time interval, the time gap in which the communication is stopped, has begun to then restart the next reference message during synchronization by activating the time trigger. However, the time master or external time base, in particular a host controller, may not perform such a shift or synchronization with a single access; instead, it is necessary to wait for the return messages, i.e., the reference message having the Next_is_Gap bit, and the start of the time gap. Furthermore, a basic cycle may only be lengthened with this method but may not be shortened.

SUMMARY OF THE INVENTION

The object of the present invention is therefore to improve upon the shifting of the basic cycle with respect to access and flexibility, in particular for synchronization with an external time base such as a host controller or a second bus system or a user of a second bus system.

To achieve this object, the present invention proposes a method for controlling a bus system and a corresponding bus system having at least two users, a first user repeatedly transmitting a reference message over the bus system in at least one predeterminable time interval, the reference message being triggered by time-trigger information when time information reaches a time mark assigned to the trigger information, the time mark advantageously being altered at least once in such a way that when the time information reaches the altered time mark, there is a time shift in the trigger information.

Therefore the time trigger, i.e., the trigger information, may be shifted for the reference message without explicitly having to send a reference message having a certain bit, namely the Next_is_Gap bit, and then also having to wait until the corresponding time gap, i.e., the time interval, has begun. Thus shifting or synchronization may take place based on the basic cycle, e.g., via an external host controller as well as an external time base of a control unit, a diagnostic device, etc., or a second bus system such as a FlexRay bus linked to the bus system according to the present invention or another TTCAN bus system, etc., or it may take place via the time master of the bus system according to the present invention without having to wait for return messages from the TTCAN controller, i.e., the time master, i.e., the reference message having the Next_is_Gap bit. Due to the change in the time mark of the trigger, i.e., the particular trigger information, the basic cycle may not only be prolonged but may also be shortened, thus permitting a much greater flexibility with regard to shifting and/or synchronization.

In an expedient embodiment, the time mark is altered by using an extra time mark instead of the original time mark and accessing the extra time mark instead of the time mark for triggering the trigger information and thus the reference message.

In another expedient embodiment, the time mark is altered by addition or subtraction of a predeterminable time mark value so that, as stated, a lengthening or shortening of the time interval of two reference marks, i.e., at least one such basic cycle, may take place. In another embodiment, it is also conceivable for the time mark to be altered by multiplication or division by a predeterminable time mark value, in which case a lengthening or shortening of the basic cycle may also be achieved by selecting the predeterminable time mark value with regard to multiplication or division.

However, the time mark may advantageously only be altered within a predeterminable time range, e.g., in particular to avoid excessive lengthening or shortening, and thus a collision of the two basic cycles and/or the messages transmitted in them.

In an advantageous embodiment, the altered time mark is used only once for triggering the trigger information, i.e., during synchronization in particular, and in the subsequent reference messages, the trigger information is triggered by the unaltered time mark so that constant basic cycle lengths are again obtained. It is essentially possible according to the method described above to lengthen or shorten several basic cycles, even those following one another in succession, and in particular to do so repeatedly.

The time information expediently represents a measure of the time interval between two reference messages as the cycle time of the bus system, as mentioned above.

Although the bus system in a preferred embodiment is a TTCAN bus system according to the ISO 11898-4 standard cited above, the present invention is fundamentally more far-reaching as already mentioned in the introduction.

BRIEF DESCRIPTION OF THE DRAWINGS

FIG. 1 shows a general bus system with respect to which the present invention may be used.

FIG. 2 includes FIGS. 2a, 2b and 2c, illustrates the shifting of the reference message according to the present invention in comparison with unshifted.

DETAILED DESCRIPTION

FIG. 1 shows a bus system 100 having a first user 102 and a second user 103. These users are interconnected via a communications link 101 and corresponding interface elements 108 and 109. First user 102 is, for example, the timer or time master in the system. Each user has a timer module 104 and 105, respectively, having an internal clock source 106 and 107, respectively, such as a quartz crystal or a voltage controlled oscillator or some other oscillating circuit such as an RC element. This timer 104 and 105 represents the local time, i.e., the local clock of the particular user. For example, the timer information, which is compared with the time mark, is obtained from this timer module of the timer, i.e., of first user 102. The time mark itself, i.e., the value of the time mark, is stored in a register 116, for example. Optionally an additional register 117 is provided in which, for example, the above-mentioned extra time mark, which is used instead of the unaltered time mark, may be stored. A processor unit 114 controls the method according to the present invention, in particular the comparison of the time information with the time mark or, for example, switching as part of a shifting or synchronization to the extra time mark in register 117 and/or a time mark value contained therein and the linking of the time mark value to the time mark accordingly (i.e., by addition, subtraction, multiplication, or division). Shown with dashed lines using reference numerals 110 and 112 is an external time base, which may be either time base 112 connected directly to communications link 101 or time base 110 connected via a user, in particular the timer. These external timer modules or external time bases also contain an internal time or clock source such as a quartz crystal, a voltage-controlled oscillator, or an oscillating circuit. These external time bases or external timers are contained in control units or controllers, diagnostic devices, etc., not included in bus system 100, for example. They may be part of another bus system, for example, or part of a user of another bus system, synchronization being possible between these external time bases and the time of bus system 100, i.e., in particular the cycle time and/or under some circumstances also the global time. Thus other bus systems such as TTCAN systems or FlexRay systems or other systems, in particular time-triggered systems, may be synchronized with the bus system according to the present invention in that the bus system according to the present invention performs a shift based on the basic cycle, i.e., the cycle time, by changing the time mark and thus shifting the trigger information to trigger the reference message.

There are various options, i.e., conditions, which, when met, prompt the time master or timer to send a reference message.

Based on a TTCAN system, a distinction must be made as part of the option event-synchronized time-triggered communication as to whether this is used.

If the option event-synchronized time-triggered communication is used, a reference message is started by the time master when the cycle time reaches the value of the time mark of the trigger in TTCAN of Tx_Ref_Trigger.

When using the event-synchronized time-triggered communication option, there are three options for starting a reference message.

1. When the cycle time reaches the value of the time mark of the Tx_Ref_Trigger and the Next_is_Gap bit has not been set in the last reference message.
2. When the Next_is_Gap bit has been set in the last reference message and no reference message has been sent before the cycle time reaches the value of the time mark of the trigger or the trigger information, here in particular Tx_Ref_Trigger_Gap.
3. If the Next_is_Gap bit was set in the last reference message and the cycle time had reached the value of the time mark, i.e., Tx_Ref_Trigger, i.e., the trigger information, and then an event such as a signal change occurs with which the system must be synchronized. Such events may also include edge changes, etc. This is therefore event synchronization of the phase.

Such a synchronization, i.e., in particular phase synchronization, is thus possible even without the event-synchronized time-triggered communication option if the predetermined time mark of the Tx_Ref_Trigger is altered for performing the synchronization, in particular is replaced by another value or by another time mark, an extra time mark, or by addition or subtraction of a time mark value or multiplication or division by a time mark value. In the first case, this takes place so that the time mark, e.g., in register 116 of FIG. 1, is replaced by an extra time mark in register 117 of FIG. 1. If synchronization is to be performed, the system switches from register 116 to register 117 as part of the corresponding basic cycle and the extra time mark in register 117 is then reached by the time information, in particular time module 104, so that the reference message is started for initiating the corresponding basic cycle by triggering the trigger, namely Tx_Ref_Trigger here. Likewise, however, a corresponding time mark value may be entered in register 117 and then linked via processing unit 114 to the unaltered or original time mark value or original time mark in register 116 according to a predeterminable link, so that there is then an altered value, i.e., an altered time mark in register 117 or register 116. This modification of the unaltered time mark value or unaltered time mark may be accomplished by addition or subtraction of a time mark value, resulting in lengthening or shortening of the corresponding basic cycle as defined by the corresponding reference message. The same is also true for multiplication or division by such a time mark value, so that even in this way, the time mark value may be changed, i.e., increased or reduced, so that by increasing and reducing this time mark, it is possible to lengthen or shorten at least one corresponding basic cycle. The time trigger, i.e., the trigger information for the reference message, is therefore shifted so that the reference message is triggered earlier or later accordingly.

The range in which the trigger may be shifted, i.e., the range in which the time mark may be altered, may be determined in particular by the system configuration, e.g., to ensure a smooth sequence of the individual consecutive basic cycles or to prevent the loss of individual basic cycles or overlapping of individual basic cycles and thus a potential collision of the messages transmitted in these basic cycles. In other words, either the extra time mark is predetermined with regard to the values it may assume, i.e., the limits, or the time mark value used for modification of the time mark may be only within certain limits. This of course depends on the type of modification used, i.e., addition, subtraction, multiplication, or division.

In the execution of the method, two variations are possible: first, a shift in relation to the set time mark and, secondly, a shift to a predetermined point in time.

The shift in relation to the set time mark, i.e., the shift by a certain period of time, i.e., to compensate for a measured or calculated deviation from a desired time trigger, takes place in that the host in particular, i.e., the external user to be synchronized or the timer, i.e., the time master, within the bus system enters the corresponding time mark value, i.e., the positive or negative difference value, for example, or enters the corresponding multiplier or quotient in a register, in particular register 117 of the TTCAN controller, which functions as the time master, and activates the shift. The TTCAN controller as the time master triggers the next reference message when the cycle time reaches the corresponding value, e.g., the sum of the time mark and the difference value or, in the case of multiplication or division, the corresponding result value. During synchronization, only the time mark itself, i.e., the original unaltered time mark, may be taken into account for the following reference messages, so that the constant basic cycles are used further until the host performs the next synchronization in particular. However, it is also conceivable for certain patterns of time mark values or extra time marks to be entered sequentially or repeatedly into the registers, in particular register 117, and processed, so that special time patterns related to the basic cycles may be set. During simple synchronization, such a shift occurs only once and then the normal basic cycles of a constant predetermined length run during synchronization with the synchronization partner.

The second option is shifting the next reference message to a certain point in time, which occurs due to the fact that the host, i.e., the external process participant (or again the time master itself) that is to be synchronized, enters the corresponding time value of the time mark in a register of the TTCAN controller, in particular register 116 or register 117, namely the TTCAN controller which functions as the time master, and then activates the shift. This activation of the shift is usually triggered, i.e., performed, by the external process participant to be synchronized. The TTCAN controller then triggers the next reference message when the cycle time reaches the predetermined time value of the time mark. For the subsequent reference messages, only the time mark that already existed is taken into account, and this is continued until the host performs the next synchronization.

This will be explained again with reference to FIG. 2, which includes FIGS. 2a, 2b and 2c. FIG. 2a shows a sequence of four basic cycles BZ1 through BZ4 initiated by corresponding reference messages RN1 through RN4, which are transmitted repeatedly in a constant time interval. Therefore all basic cycles BZ1, BZ2, BZ4 and in particular BZ3 are the same length. In FIG. 2b, basic cycle BZ3 is shortened in particular as part of a synchronization. Basic cycles BZ1 and BZ2 have the original length triggered by reference messages RN1 and RN2. RN3, i.e., the reference message of basic cycle 3, triggers this in the normal manner, as indicated. Next reference message RNS, however, is triggered by the corresponding time mark value and the trigger based thereon so that basic cycle 4 begins at a much earlier point in time. Basic cycle 3 is therefore shortened to BZ3S. This is then followed by basic cycle 4 and a normal basic cycle 5 triggered by a reference message RN5.

FIG. 2c shows the lengthening of basic cycle BZ3 by a reference message sent later. Here again the two usual first basic cycles BZ1 and BZ2 triggered by reference messages RN1 and RN2 are shown. RN3 is also started at an interval which is predeterminable in time and is equidistant from RN1 and RN2. However, subsequent reference message RNL is also triggered by the change in time mark value and thus by delayed triggering of the trigger information, but much later than depicted in FIG. 2a. This means that basic cycle 4, i.e., BZ4, is triggered by RNL at a later point in time. Therefore, basic cycle 3 is lengthened to BZ3L, as shown in FIG. 2c. The host controller in particular is therefore able to perform the synchronization with a single access to the TTCAN controller and does not need to wait for return messages from the TTCAN controller (reference message having Next_is_Gap bit). In addition, synchronization in both directions is possible. A basic cycle may thus be lengthened or shortened via the method according to the present invention. In addition, however, the length of the basic cycle may be supplied in a variable form, triggered by the host controller or predetermined in the time master of the TTCAN system, and in particular may also obey a certain time pattern. It is thus conceivable for basic cycles of different lengths to be linked together to form one total cycle, thereby allowing any synchronization and data transmission.

What is claimed is:

1. A method for controlling a bus system including at least two users, comprising:
   storing a first time mark in a first register;
   storing a second time mark in a second register;
   repeatedly transmitting by a first user a reference message over the bus system in at least one predeterminable time interval;
   triggering the reference message by a trigger information when a time information reaches a time value of the first time mark, the first time mark being stored in the first register of the memory of the first user;
   switching the system from the first register to the second register;
   triggering the reference message by a time shifted trigger information when the time information reaches a time value of the second time mark, the second time mark being stored in the second register of the memory of the first user; and
   switching the system from the second register to the first register in such a way that, for subsequent reference messages, triggering the reference message by the trigger information when the time information reaches the time value of the first time mark.

2. The method as recited in claim 1, wherein the time information triggering the reference message is a measure of the at least one predeterminable time interval between two reference messages or a cycle time of the bus system.

3. The method as recited in claim 1, wherein the bus system is a TTCAN bus system according to ISO 11898-4.

4. A device for controlling a bus system having at least two users, a first user repeatedly transmitting a reference message in at least one predeterminable time interval over the bus system, the device comprising:
   an arrangement for triggering the reference message by a trigger information, the arrangement including:
      a timer module having a clock source:
      a first register storing a first time mark;
      a second register storing a second time mark; and
      a switching element for selectively switching the system between the first register and the second register;
   wherein, when the system is switched to the first register and a time information reaches a time value of the first time mark stored in the first register, the reference message is triggered by the trigger information;
   wherein, when the system is switched to the second register and the time information reaches a time value of the second time mark stored in the second register, the reference message is triggered by a time shifted trigger information; and
   wherein for subsequent reference messages, the system is switched from the second register back to the first register and the reference message is triggered by the trigger information when the time information reaches the time value of the first time mark.

* * * * *